United States Patent
König, deceased et al.

[11] Patent Number: 5,482,366
[45] Date of Patent: Jan. 9, 1996

[54] APPARATUS FOR TREATING DOUGH WITH A BEARINGLY SUPPORTED TOOL CARRIER

[76] Inventors: Helmut König, deceased, late of Graz, Austria; by Elisabeth König, Administratrix, Ursprungweg 70, Graz, Austria, A-8045

[21] Appl. No.: 302,823
[22] PCT Filed: Mar. 16, 1993
[86] PCT No.: PCT/AT93/00050
§ 371 Date: Sep. 14, 1994
§ 102(e) Date: Sep. 14, 1994
[87] PCT Pub. No.: WO93/18657
PCT Pub. Date: Sep. 30, 1993

[30] Foreign Application Priority Data

Mar. 16, 1992 [AT] Austria ..................... 527/92

[51] Int. Cl.⁶ ..................... A21C 1/02; A21C 1/14
[52] U.S. Cl. ..................... 366/97; 366/100; 366/203; 366/288
[58] Field of Search ..................... 366/64–66, 96, 366/97, 98, 100, 197, 203, 219, 240, 244–251, 261, 288, 292, 297–301, 347; 99/348; 425/204

[56] References Cited

U.S. PATENT DOCUMENTS

| | | |
|---|---|---|
| 957,088 | 5/1910 | Petri . |
| 1,691,843 | 11/1928 | Dehuff ..................... 366/203 |
| 1,756,078 | 4/1930 | Aeschbach ..................... 366/96 |
| 2,339,439 | 1/1944 | Tone . |
| 2,345,266 | 3/1944 | Karp . |
| 2,539,017 | 1/1951 | Hansen . |
| 2,621,907 | 12/1952 | Maurer et al. ..................... 366/261 X |
| 2,640,688 | 6/1953 | Moller ..................... 366/97 |
| 3,421,741 | 1/1969 | Baechler . |
| 3,677,100 | 7/1972 | Kajiwara . |

FOREIGN PATENT DOCUMENTS

| | | |
|---|---|---|
| 321253 | 3/1975 | Austria . |
| 343571 | 6/1978 | Austria . |
| 439689 | 8/1991 | European Pat. Off. . |
| 371299 | 3/1907 | France . |
| 430804 | 11/1911 | France . |
| 1596953 | 7/1970 | France . |
| 217252 | 6/1909 | Germany . |
| 2841199 | 4/1979 | Germany . |
| 1757361 | 3/1981 | Germany . |
| 3703558 | 8/1987 | Germany . |
| 502105 | 3/1939 | United Kingdom . |
| 680309 | 10/1952 | United Kingdom . |
| 2015362 | 9/1979 | United Kingdom . |

Primary Examiner—Charles E. Cooley
Attorney, Agent, or Firm—Salter & Michaelson

[57] ABSTRACT

An apparatus for stirring and, respectively, or kneading dough includes a frame (1) into which a receptacle (17) for the dough to be treated can be carried in by chassis (22). In its carried-in position, the receptacle (17) can be lifted by a lifting device (23) into a position in which at least one tool (15) extends from above into the receptacle (17). Each tool (15) is disposed eccentrically with respect to the axis (42) of the receptacle (17) and is carried by a tool carrier (4) driven around the axis (42) by a drive (41). In additon thereto, a further drive (50) for the tools (15) is provided which are movable relative to the tool carrier (4). The tool carrier (4) is bearingly supported with its periphery on a collar (2) of the frame and closes the upper opening of the receptacle (17) in its lifted position like a cover. Thereby a particular intensive and continuous treatment of the dough in the receptacle (17) is obtained and the stresses on the receptacle (17) are reduced.

12 Claims, 3 Drawing Sheets

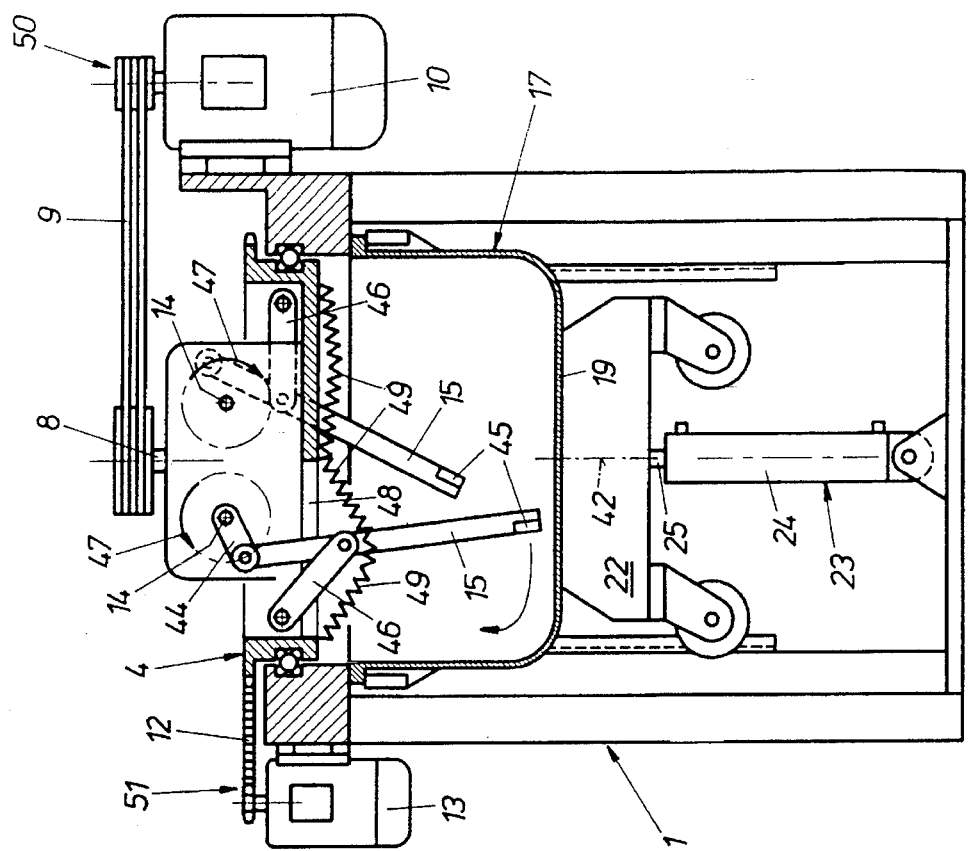
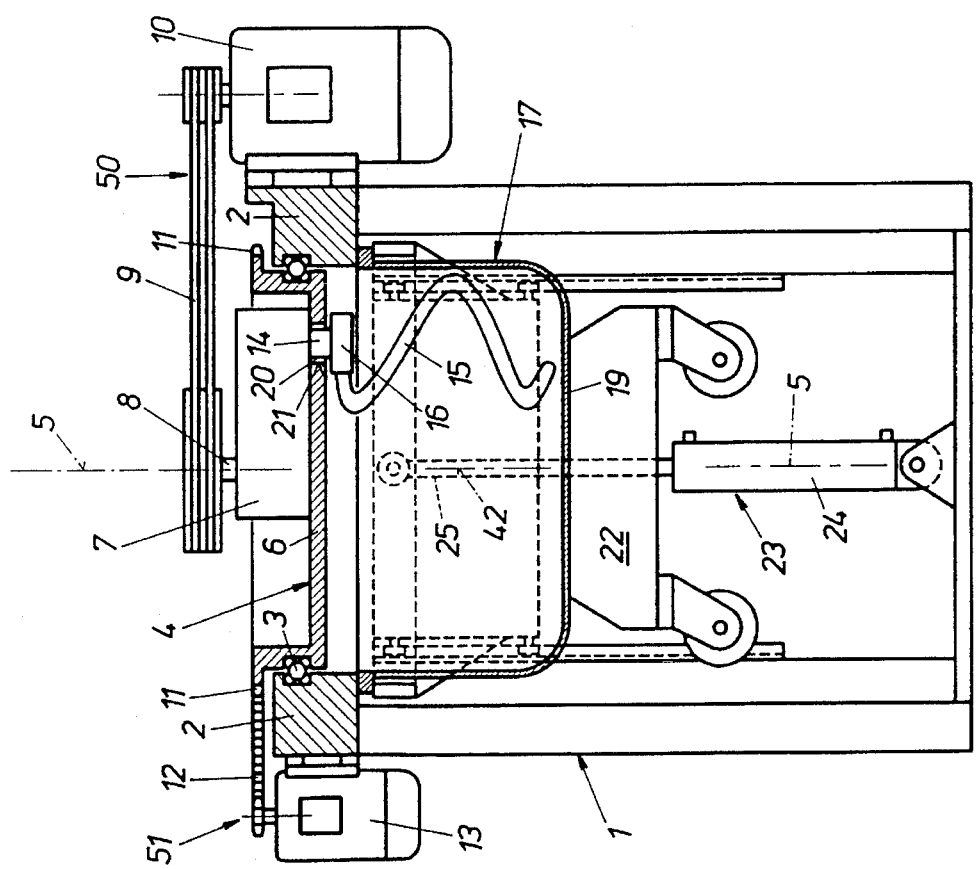
Fig. 8
Fig. 1

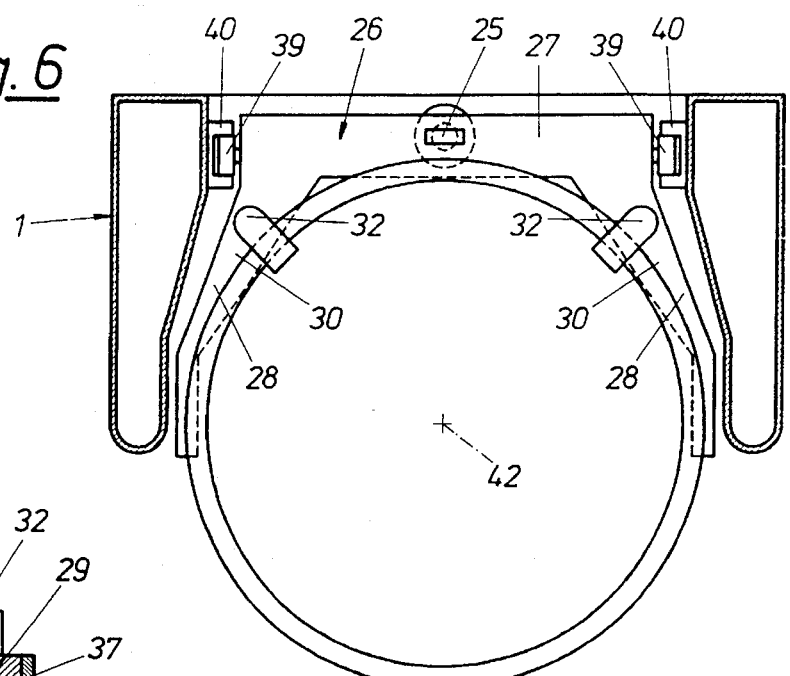
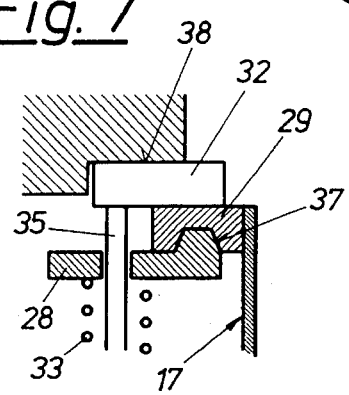
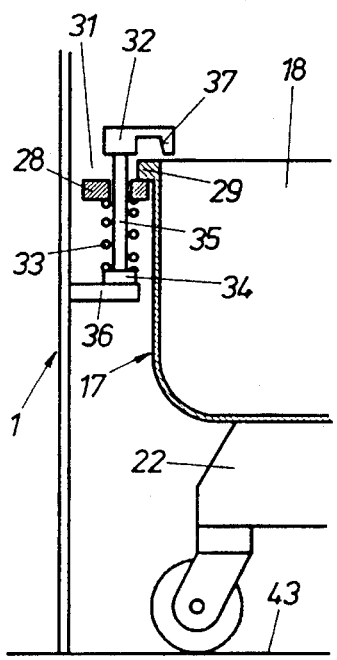
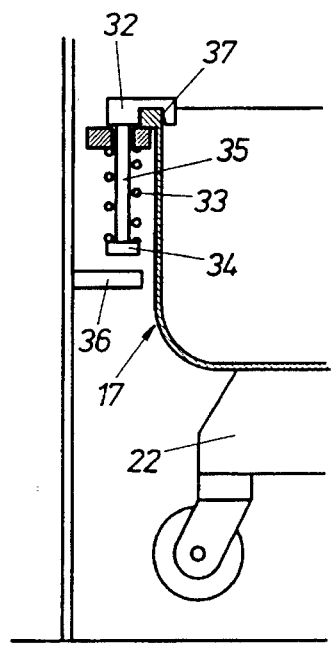
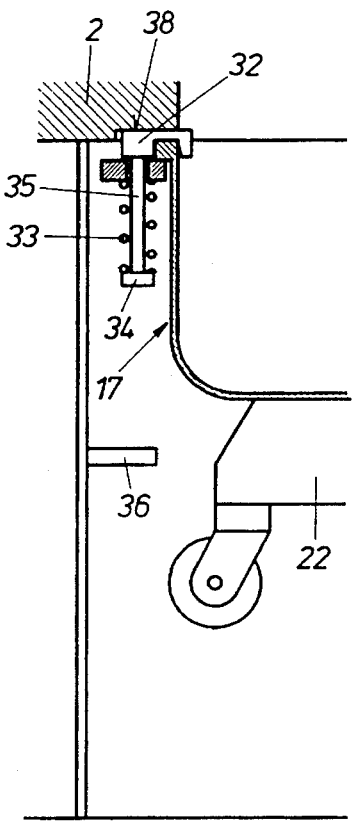

APPARATUS FOR TREATING DOUGH WITH A BEARINGLY SUPPORTED TOOL CARRIER

BACKGROUND AND SUMMARY OF THE INVENTION

The invention relates to an apparatus for stirring and, respectively, or kneading dough, comprising a frame having a seat into which a receptacle for the dough can be inserted and in which the receptacle in its inserted position can be lifted by a lifting means along guide means into a position in which at least one tool carried by the frame for stirring and, respectively, or kneading the dough extends into the receptacle that cannot be rotated in this position, each tool being driven by a drive means carried by the frame to a revolving or kneading motion, at least one tool being eccentrically with respect to the axis of the receptacle supported within a tool carrier for relative motion with respect to it, which tool carrier being rotatable by a drive means relative to the receptacle around the axis thereof and in the lifted position of the receptacle forming a closure cover for the upper opening of the receptacle, and wherein the frame comprises a collar against which the edge of the upper opening of the receptacle is lifted for reaching its lifted position. Such an apparatus is known from GB-A 2 015 362.

Numerous apparatus are known for stirring or kneading of dough. The usual construction of mixing machines comprises a spiral member as the tool which is driven via the machine head, a machine support being lifted so that the mixing vat which can be separated from the apparatus frame, can be drawn out. Within other apparatus, the mixing head is not liftable in vertical direction, but can be swung open to the rear. Such apparatus have the advantage that the treated dough can be conveyed by means of the receptacle so that the dough can be transported to another working place of the bakery in a time-saving manner. Only within apparatus for treating smaller amounts of dough, the receptacle cannot be carried out but is stationarily fixed to the frame. If the tools necessary for treating the dough are not liftable, they hinder taking out the finished dough.

For a heavy industrial machine it is known to prepare the dough to be treated within a trough, kneading tools being horizontally disposed. For the discharge of the dough, the trough is tilted around a horizontal axis.

There is also known an apparatus in which a receptacle which can be carried by means of a chassis can be carried towards the frame into its seat and by a hydraulic means can be brought into the working position in which mixing tools disposed in the machine head engage into the receptacle (Prospectus Collette High Speed Mixers).

With the exception of the said heavy industrial machine, these known mixing machines have the disadvantage that the force flow leads via mixing tool, mixing machine support, connection thereof to the receptacle and via the dough mass again back to the tool. Therefore, all connection elements must be constructed very heavy and strong fixing means must be provided between receptacle and mixing machine support in order to meet the considerable forces created during mixing. Also the receptacles themselves must be constructed so strong that also their receptacle walls can meet the forces created. Nevertheless, in practice there again and again happen deformations, even if sometimes support rollers are provided on the support member, against which the wall of the receptacle is abutted for the purpose to avoid the said deformations.

The latter disadvantage is moderated within a construction of the initially described kind by bearingly supporting the tool carrier on a bridge bridging the collar of the frame. Thereby, the forces indeed to not flow via the receptacle, but the bridge increases the constructional height of the apparatus and considerable bending forces act onto rotational bearing of the tool carrier by the reaction forces introduced by the tool. The invention has at its object to design an apparatus of the initially described kind in which the said stresses are considerably moderated and in which, in comparison to the last mentioned known apparatus, the constructional height is reduced and the rotational support of the tool carrier is improved. Further, the invention has at an object to design an effective and versatile construction with respect to the treatment of the dough. The invention solves this task—starting from the initially described known apparatus—by the features that the tool carrier with its periphery is bearingly supported on the collar. Thereby, the reaction forces introduced from the tool or the tools are considerably more favourable diverted from the tool carrier to the frame as within the lastly described known apparatus and, in addition thereto, the constructional height is reduced by saving the bridge and the construction is simplified. Due to the fact that the support means for the tool carrier are transferred from its center to its periphery, there is also more space at disposal for accommodating the tools or their drive means. Therefore, the invention can also be applied to very great apparatus, i.e. for receptacles having a great capacity, where the reaction forces are correspondingly high. Therefore, the invention can also be used for such receptacles which due to their great weight must be carried on roller means. Preferably, within the spirit of the invention, the receptacle is provided with a chassis. This enables one to use several receptacles alternately, which must be changed very quickly. The receptacle which in operation, i.e. in its lifted position, is stationary, needs no effort for its drive means for rotation, what is of substantial advantage in particular for great machines due to the considerable weight of a large receptacle together with the dough mass contained therein. Fixing the receptacle in the operation position does not cause any problem and can be done without great power requirement in each rotational position of the receptacle which is of rotational-symmetrical shape, since the receptacle is not positioned in the flow of the forces. Further, the inventive apparatus is variable with respect to the tools used and the already mentioned space which is substantially at disposal on the tool carrier, enables a stable bearing of all tools used.

Also the advantage given within the lastly described known construction is maintained that the tool carrier in the lifted position of the receptacle constitutes a closure cover for the upper opening of the receptacle so that an unintentional escape of dough or dough portions is avoided in a simple manner.

According to a preferred embodiment of the invention, the tool carrier extends like a pot into the collar from above and is bearingly supported for rotation with a cylindrical wall by means of a bearing on an also cylindric wall of the collar. This results in the most favourable construction for deviating the reaction forces into the frame.

According to a further embodiment of the invention, separate drive means are provided for the rotational movement of the tool carrier and for the movement of the tools relative to it. This is more favourable than a construction in principle also possible, which deviates the movement of the tool carrier and the movement of the tools frome the same driving motor, for example by means of a planetary gear carried by the tool carrier. However, using separate drive means enables one to adjust the movement of the tools completely independent from the rotational movement of the tool carrier and optionally to change the tool movement during the treating process without that this has any influence upon the rotational movement of the tool carrier. It is of particular advantage within the spirit of the invention, if the tool carrier carries a gear means for the movement of the tools which comprises a driving shaft being positioned in the axis of the receptacle, which shaft being driven by a motor carried by the frame, preferably by means of a V-belt. This results in a particular simple and favourable construction, the gear means enabling one to adjust the speed of revolution of the tools to the respective desired requirements.

As already mentioned, the invention is versatile with respect to the kind of the tools used which must not necessarily rotate around their own axes, but may also be kneading tools, which move like a pendulum. In the first named case, the tool carrier according to the invention is provided with at least one opening in its bottom which is disposed eccentrically with respect to the axis of the receptacle and is penetrated by the shaft of a tool extending towards the axis of the receptacle, preferably using a bearing, this shaft being a driving shaft of the gear. For kneading tools, it is possible within the spirit of the invention to provide the tool carrier in its bottom with at least one slot penetrated by a tool which on its upper end is linked to a crank on the driven shaft of the gear and at a lower location is linked to a connecting rod articulated to the tool carrier. Suitably, according to the invention the remaining portions of each slot are covered by a bellow member for the purpose to avoid an, undesired escape of material to be treated from the receptacle. Within such a construction it is suitable to provide at least two tools which at each moment have different operation positions in order to optimally treat the dough. It is particularly favourable within the spirit of the invention to link always two tools to two cranks which are driven in opposite direction.

The inventive apparatus is comparatively insensitive to the relative position of the tools with respect to the receptacle. However, for practical reasons and for the purpose of avoiding undesired tensions in the receptacle it is suitable to anchor the receptacle in the lifting device which is known per se, in a particular manner. For this, a further embodiment of the invention provides that the lifting device comprises a fork between the legs thereof the receptacle can be carried in and on which a clamping device for the uper edge of the receptacle is provided. According to a further embodiment of the invention, this clamping device comprises at least two bows overlapping the rim of the receptacle, which bows in the lifted position of the receptacle are pressed by springs against the rim of the receptacle, however in the carrying-in position engage stops by means of protrusions and in this position are lifted against the action of the springs, leaving free the rim of the receptacle. Within this, an automatic centering can be obtained by providing the bows and respectively, or the rim of the receptacle with oblique surfaces for centering the receptacle.

DESCRIPTION OF THE DRAWINGS

In the drawing examplative embodiments of the subject matter of the invention are schematically shown.

FIG. 1 shows in a vertical section an apparatus constructed as a mixing machine.

FIG. 3, 4 and 5 show the receptacle of the apparatus in three different lifting phases.

FIG. 6 is a horizontal section through the column of the machine.

FIG. 7 shows in detail a variant of the clamping device for the rim of the receptacle.

FIG. 8 shows an embodiment variant having two kneading arms, in a section similar to FIG. 1.

DETAILED DESCRIPTION OF THE PREFERRED EMBODIMENTS

Figure 10:
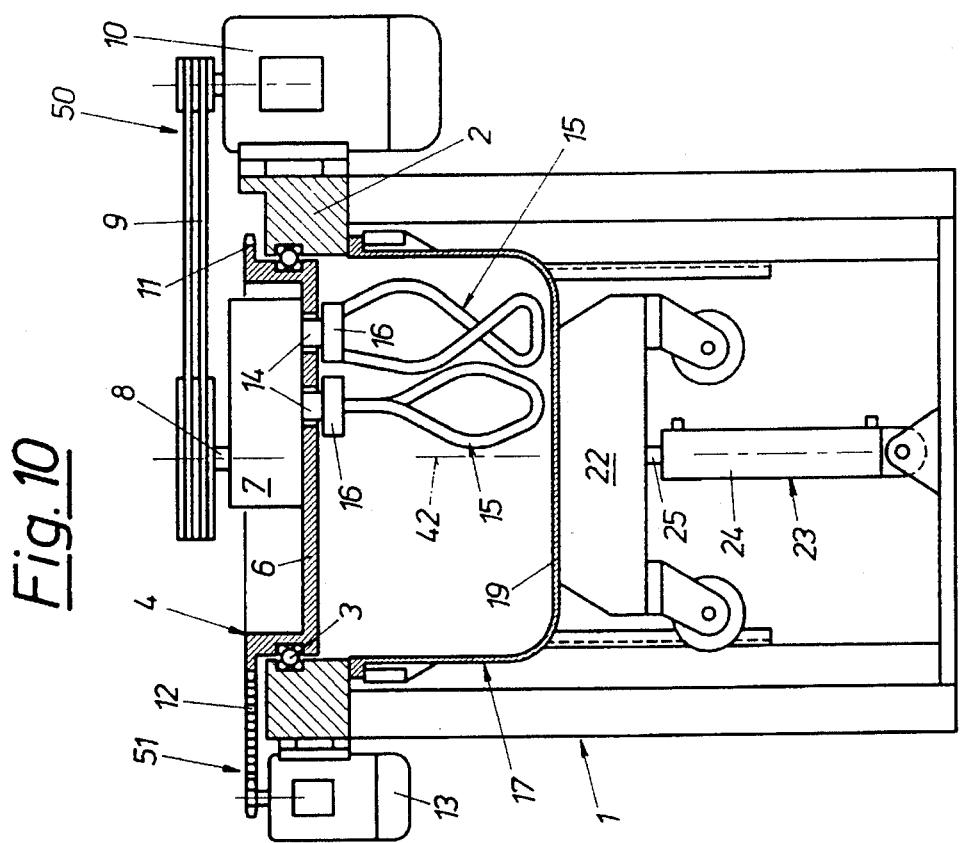
FIG. 10 shows an embodiment variant having two double helix kneading arms, in a section similar to FIG. 1.
Figure 2:
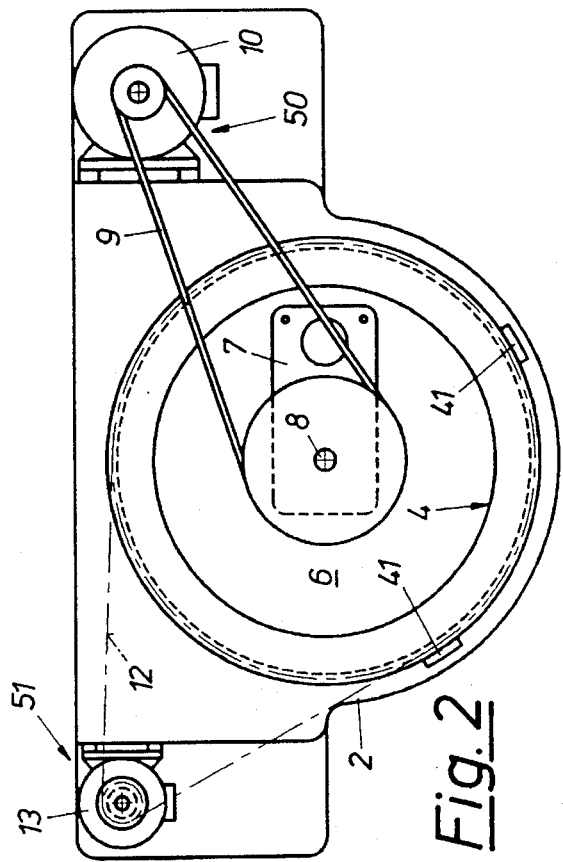
FIG. 2 shows a top view to FIG. 1.

The apparatus according to FIGS. 1 to 6 comprises a frame 1, to which a collar 2 is connected from above, in which by means of a roller bearing 3 a tool carrier 4 formed as a rotational body is bearingly supported for rotation around a vertical axis 5. The tool carrier 4 is of pot-like shape and has a cylindrical outer-wall, the bearing 3 being positioned between this outer wall and a cylindrical inner wall of the collar 2. The tool carrier 4 carries on its bottom 6 a gear means 7 which may be a control gear means and comprises a driven shaft 8 centrically disposed in the axis 5 and driven via a V-belt 9 by a motor 10 flanged laterally to the collar 2. The tool carrier 4 is driven for rotation around the axis 5 by means of a gear rim 11 provided on the upper edge of the cylindrical outer wall of the tool carrier 4 and cooperating with a chain 12 driven by a chain wheel fixed to the driven shaft of a further motor 13. The motor 13 is also flanged laterally to the collar 2, and this on that side of the apparatus that is disposed opposite to the motor 10.

The gear means 7 has a driven shaft 14 protruding to below to which a tool 15 is connected which in this embodiment is shaped as a helix-shaped mixing or kneading tool connected to the shaft 14 by means of an arm 16. The tool 15 protrudes in the operation position of a receptacle 17 from above through its opening 18 into the interior of the receptacle and extends nearly to the bottom 19 of the receptacle 17. For reliably guiding the driven shaft 14 and therefore of the tool 15, this shaft can be bearingly supported in the bottom 6 by means of a bearing 20 which is inserted into an opening 21 of the bottom 6 penetrated by the shaft 14.

The receptacle 17 is connected on its bottom 19 to a chassis 22 and can be lifted into the operation position shown in FIG. 1 by means of a hydraulic lifting device 23. The lifting device 23 has a hydraulic cylinder 24, the piston rod 25 thereof being connected with a seat 26 (FIG. 6) for the receptacle 17. The seat 26 is U-shaped—when seen in a top view (FIG. 6)—and has two arms 28 connected to each other by a transverse member 27 connected to the piston rod 25, which arms engage below the outwardly bent rim 29 of the receptacle 17, when the receptacle 17 is carried into the seat 26 (FIG. 3). Suitably, the dimensions are so choosen that the arms 28 constituting carrier arms for the receptacle 17 engage its rim 29 from below not only in the region of two locations positioned diametrically opposite to each other, but also in two locations 30 positioned therebetween (FIG. 6) in order to more equally distribute the stresses on the receptacle 17 in order to fix the receptacle 17 to the lifting device 23 during the lifting process, a clamping device 31 (FIG. 3 to 5) is provided which comprises several bows 32 distributed over the periphery of the receptacle 17 in the region of the seat 26, which bows are positioned over the rim 29 of the receptacle 17 when the receptacle 17 is carried into the seat 26 (FIG. 3). Each bow 32 has a protrusion 35 extending to below and serving as a guide means for a compression spring 33 clamped between the arm 28 and a flange 34 of the protrusion 35, so that the spring tends to press the bow 32 against the arm 28. In the position of the receptacle 17 in which it is carried in (FIG. 3), however, the flange 34 engages a stop 36 of the frame 1 so that the bow 32 is lifted against the action of the spring 33 to such an extent that the rim 29 of the receptacle 17 can be carried below the bows 32 without any problem. As soon as the lifting device 23 is actuated, the receptacle 17 is lifted (FIG. 4) whereby the springs 33 release by and by and the bows 32 engage on the rim 29. For a better centering, the bows 32 have the shape of hooks and are provided with oblique surfaces 37. In such a manner, the rim 29 of the receptacle 17 is connected in an exactly predetermined position to the arms 28. The receptacle 17 is lifted by the lifting device 23 until the bows 32 with their top surfaces engage a stop 38 (FIG. 5) of the collar 2. During the lifting process, the seat 26 is guided in a trapezoidal guide means 40 by means of rollers 39 (FIG. 6).

Within the embodiment according to FIG. 7, the oblique surfaces 37 are not provided on the bows 32 but on the rim 29 of the receptacle 17 and on the arms 28.

In addition thereto, indexing locations 41 may be provided (FIG. 2) which ensure that the axis 42 of the receptacle 17 (FIG. 1) coincides with the axis 5. Further, these indexing locations 41 provide for a lateral support of the receptacle 17 and take up the lateral impact forces of the tool 15. However, the receptacle 17 is secured against rotation only by clamping the rim 29 of the receptacle 17 to the arms 28 by means of the bows 32.

When the receptacle 17 is lowered, it can be seen from FIG. 3 to 5, that in an inverse sequence the receptacle 17 is freed until it can be carried out of the seat 26, as soon as the carriage 22 of the receptacle 17 has reached the bottom 43 and the bows 32 have been loosened from the receptacle rim 29 (FIG. 3).

Suitably, the oblique surfaces 37 are disposed in pairs so that a conical groove, for example having a trapezoidal cross section, is provided in that member that is provided with the oblique surfaces, as well as a protrusion having a corresponding trapezoidal cross section on that member which engages into this groove.

Figure 9:
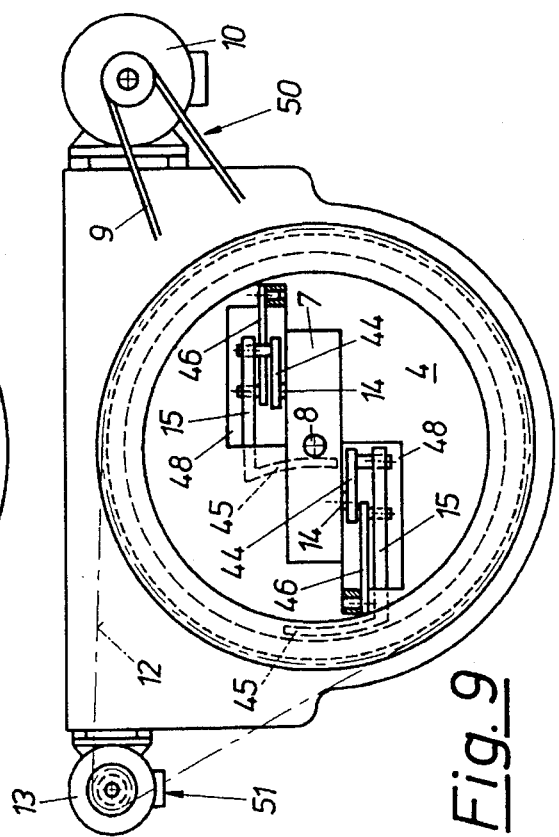
FIG. 9 is a top view to FIG. 8.

FIGS. 8 and 9 show an embodiment, which is constructed as a double stroke kneader. Within this embodiment the gear means 7 comprises two horizontal driven shafts 14 protruding to opposite sides from the box of the gear means 7. To each one of these driven shafts 14 a crank 44 is fixed to which the one end of the tool 15 in form of a mixing arm is linked, which mixing arm carries on its lower end a blade 45. Between the blades 45 and the linking locations to the cranks 44, connecting rods 46 are linked to the mixing arms 15, which connecting rods with their other ends are articulated to the tool carrier 4. The two cranks 44 rotate in opposite directions, as the arrows 47 show, and are fixed to the driven shafts 14 extending in opposite directions so that the two tools 15 at each moment have different operation positions. Each tool 15 penetrates a slot 48 in the bottom 6 of the tool carrier 4, which slot 48 is exactly so long that the said pendulum movement of the tool 15 and of the connecting rod 46 connected to it is enabled. The mixing arms forming the tools 15 are tightened with respect to the tool carrier 4 by means of bellows so that an unintentional escape of dough or dough portions through the slots 48 is avoided.

This embodiment has the advantage, when compared with an apparatus comprising one single kneading arm only, that the mixing time is reduced by one half. Each kneading arm constituting the tool 15 strikes always from the center of the receptacle 17 towards the rim thereof, which means that dough is kneaded very gently and is heated to a low extent only. Since the tool 15 is also lifted during the cycle of its motion, not only those portions of the dough are treated which are located in the receptacle 17 in the region of its bottom 19, but also the dough portions positioned higher in the receptacle 17. Further, the motion cycles of the two tools 15, which are oppositely offset to each other have as a consequence that always the one tool 15 presses the dough on the other tool 15 to below so that the kneading action onto the dough positioned in the receptacle 17 is equalized.

The embodiment according to FIG. 10 is similar to that according to FIGS. 1 to 6, however, two tools 15 are provided which are connected to arms 16 fixed to two driven shafts 14 of the gear means 7. The two driven shafts 14 are both disposed eccentrically with respect to the axis 42 of the receptacle and are offset with respect to each other for about 90°, when seen in their direction of revolution. Each tool 15 has the shape of a double helix, whereby a particular intensive mixing of the dough is ensured.

If the double helices according to FIG. 10 are detachably connected to the arms 16, the apparatus can easily be changed to an apparatus according to FIGS. 1 to 6, the unused driven shaft 15 or the arm 16 fixed thereto running without any load. Also a change to an embodiment according to FIGS. 8 and 9 would be possible if the bottom 6 of the tool carrier 4 of the embodiment according to FIG. 10 would be provided with the respective slots and if the gear means 7 would correspondingly be changed or would have also lateral driven shaft ends which, when used, could be connected with the tools penetrating through the slots 48.

The drive means 50 for the tool 15 or the tools and the drive means 51 for rotation of the tool carrier 4 could, if desired, also be combined to one single drive means. Within such a construction, the shafts 14 of the tools 15 would have to be connected to planet wheels bearingly supported for rotation in the tool carrier 4, which planet wheels revolve around a central sun wheel which is carried by the frame 1 and secured against rotation. Such a construction, however, would be restricted to a fix relation of the speeds of revolution of tool carrier 4 on the one hand and of the tools 15 on the other hand.

By the said revolution motion of the tool carrier 4 and by the eccentric disposal of at least one tool 15 on the tool carrier 4, all dough portions contained in the receptacle 17 are treated so that an intensive and continuos treatment of the dough is ensured. If desired, however, also an additional tool may be used which is disposed in the axis 42 of the receptacle 17.

Optionally, also more than two tools 15 may act onto the dough within the receptacle 17. The tools must not all be equal.

What is claimed is:

1. Apparatus for treating dough comprising:

a frame having a seat into which a receptacle for receiving dough can be inserted, said receptacle having an upper opening, an upper rim a circumferential edge defining said opening, and having an axis;

lifting means for lifting the seat and the receptacle to an operable position;

guide means mounted on the frame for guiding the receptacle in the seat;

a tool carrier rotatably mounted on said frame, said tool carrier having an outer periphery;

at least one tool carried by the tool carrier for treating dough in the receptacle, said at least one tool extending into the receptacle when the receptacle is in the operable position;

tool drive means carried by the frame for driving said at least one tool in a revolving motion, said at least one tool being eccentrically carried by the tool carrier with respect to the axis of the receptacle; and tool carrier drive means for rotating the tool carrier relative to the receptacle around the axis of the receptacle when said receptacle is in the operable position, said tool carrier forming a closure cover for the opening of the receptacle, wherein the frame further comprises a collar against which the edge of the opening of the receptacle is lifted by said lifting means for reaching the operable position, characterized in that the tool carrier is bearingly supported with the outer periphery thereof on the collar.

2. Apparatus according to claim 1, characterized in that the tool carrier is pot-shaped and extends into the collar from above and is bearingly supported by said collar for rotation by means of a bearing.

3. Apparatus according to claim 1, characterized in that tool carrier carries gear means for achieving the motion of the at least one tool, said gear means comprising a driven shaft which extends along said axis of the receptacle, said shaft being driven by a motor of said tool drive means, said motor being carried by the frame and driving said shaft via a V-belt coupled to said shaft and motor.

4. Apparatus according to claim 3, characterized in that the tool carrier comprises at least one opening in the bottom thereof which is disposed along an axis positioned eccentrically with respect to the axis of the receptacle and said at least one opening of said tool carrier being penetrated by a second driven shaft of said gear means, said second shaft extending along an axis parallel to the axis of the receptacle.

5. Apparatus according to claim 3, characterized in that the tool carrier comprises at least one slot in the bottom thereof which is penetrated by said at least one tool, said at least one tool having an upper end which is connected to a crank of the driven shaft of the gear means, and below the connection of the crank and the at least one tool said at least one tool being connected to a connecting rod of said gear means which is articulated to the tool carrier.

6. Apparatus according to claim 5, characterized in that a remaining portion of said at least one slot which is not penetrated by said at least one tool is covered by a bellow.

7. Apparatus according to claim 5, characterized in that at least two tools are provided, each tool having a different operation position.

8. Apparatus according to claim 7, characterized in that said at least one two tools are linked said crank and a second crank which are both driven by said gear means in opposite directions.

9. Apparatus according to claim 1, characterized in that said lifting means comprises a U-shaped member having a pair of arms, the receptacle being carried between the arms of the U-shaped member, and a clamping device for securing the upper rim of the receptacle.

10. Apparatus according to claim 9, characterized in that the clamping device comprises at least two bows overlapping the rim of the receptacle and being pressed by springs against the rim of the receptacle in the operable position.

11. Apparatus according to claim 10, characterized in that one of the bows and the rim of the receptacle are provided with oblique surfaces for centering the receptacle.

12. Apparatus according to claim 1, characterized in that the receptacle is provided with a chassis.

\* \* \* \* \*